H. WHITESELL.
SPRING TIRE.
APPLICATION FILED NOV. 7, 1917.
1,271,109.
Patented July 2, 1918.
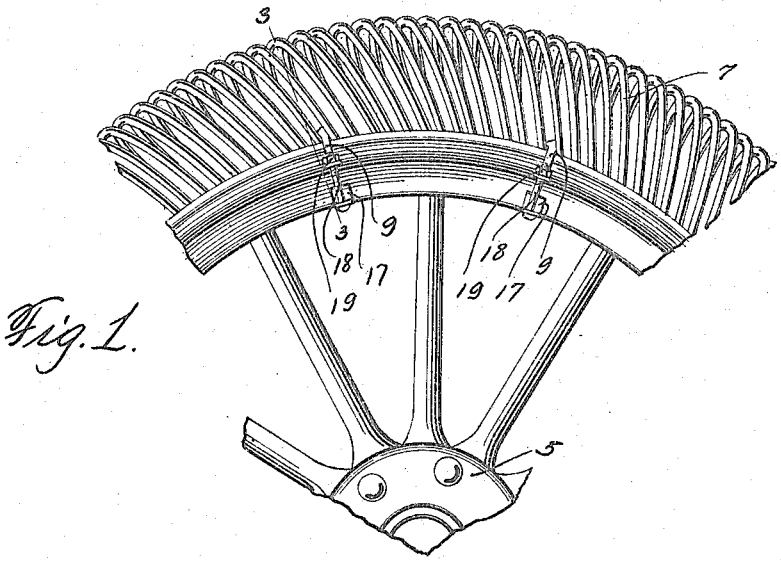
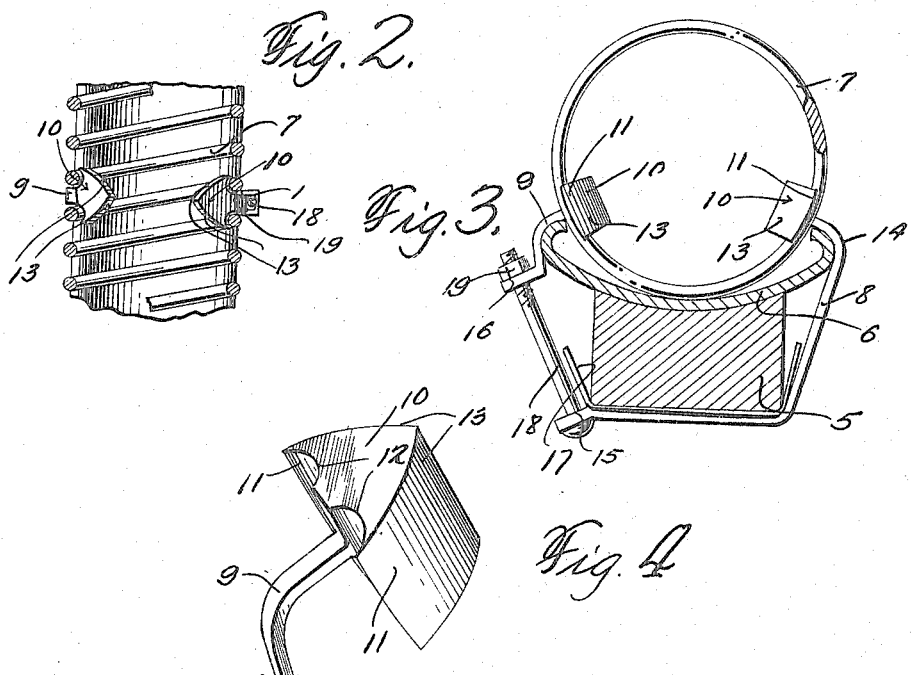
Witnesses
Inventor
H. Whitesell
By
Attorney

UNITED STATES PATENT OFFICE.

HARRY WHITESELL, OF BROWERVILLE, MINNESOTA.

SPRING-TIRE.

1,271,109.

Specification of Letters Patent. Patented July 2, 1918.

Application filed November 7, 1917. Serial No. 200,748.

*To all whom it may concern:*

Be it known that I, HARRY WHITESELL, a citizen of the United States, residing at Browerville, in the county of Todd, State of Minnesota, have invented certain new and useful Improvements in Spring-Tires; and I do hereby declare the following to be a full, clear, and exact description of the invention, such as will enable others skilled in the art to which it appertains to make and use the same.

This invention is an improvement in vehicle wheels and has particular reference to a spring tire.

An object of the invention is to dispense with the use of pneumatic and cushion tires by providing an improved tire or tread formed of coiled wire and which will have the same cushioning and shock absorbing qualities of tires now generally employed.

Another object is to provide an improved fastening means for clamping the tire to the rim of a wheel in such manner as to securely retain said tire in position and prevent accidental displacement thereof.

A further object is to provide a tire and fastening means of simple and inexpensive construction and which will be effective in carrying out the purpose for which it is designed.

The inventive idea involved is capable of receiving a variety of mechanical expressions one of which, for the purpose of illustrating the invention, is shown in the accompanying drawings wherein:—

Figure 1 is a side elevation of a vehicle wheel showing the tire applied thereto and constructed in accordance with the invention.

Fig. 2 is an enlarged fragmentary longitudinal section.

Fig. 3 is a transverse section on the line 3—3 of Fig. 1.

Fig. 4 is a detail perspective view of one of the clamping members for securing the tire in position on the wheel.

In the drawing, the numeral 5 indicates a wheel of any desired construction having the usual rim section 6 upon which the improved tire is adapted to be mounted.

The present invention has particular reference to the peculiar construction of tire or tread, indicated by the numeral 7 and the means for securing the tire to the rim 6. The tire 7 is preferably formed of a single length of wire bent to provide a continuous coil spring, the convolutions of which are disposed in close relation and inclined as clearly shown in Fig. 1.

In order to secure the tire to the rim 6, use is preferably made of a plurality of pairs of long and short clamping members 8 and 9 respectively each member of each pair being provided upon one end thereof with a head 10 of rectangular formation in plan and provided upon parallel edges with the longitudinal wedging elements 11 forming, in conjunction with the shank of the clamping member, recesses 12 for receiving adjacent convolutions of the tire 7, the elements 11 being then engaged between said convolutions and the ones next adjacent. For the purpose of facilitating the insertion of the head of the clamp between adjacent convolutions, said head is provided with the converging beveled surfaces 13 which engage adjacent convolutions and force the same apart as the clamp is pushed inwardly. The clamp 8 is provided adjacent its head 10 with a bend 14 for receiving the adjacent edge of the rim 6 and said clamp is also bent to extend across the felly of the wheel and, to extend across the felly of the wheel and, on the end opposite the head 10, is provided with an apertured plate 15 and the clamp 9 is likewise provided with a similar plate 16. In order to prevent the portion of the clamp 8 from scratching or otherwise marring the felly of the wheel, a guard 17 is employed and formed of an elongated strip of metal or other suitable material bent to conform substantially to the felly and interposed between the same and said clamp. The means for fastening the clamps 8 and 9 in their clamping positions preferably comprises a bolt 18 extending through the plates 15 and 16 whereby the head of the bolt will engage one of said plates and threaded upon said bolt is a nut 19 adapted to engage the other plate and thus draw the adjacent ends of the clamps together so that the same will be securely engaged with the rim and thus maintain the tire 7 in its proper position. It is to be understood that any desired number of these clamps may be employed and that the tires and clamps may be made in different sizes or the clamps may be formed of such material as to enable the same to be bent in to proper shape without the liability of breaking or otherwise injuring the same.

What is claimed is:—

1. In a vehicle wheel, the combination with a rim; of a tire formed of a coil spring mounted upon said rim, clamping members for securing said tire in position and each having a head insertible between adjacent convolutions of said tire and provided with recesses for receiving said adjacent convolutions, and means connecting the clamping members for securing the same together.

2. In a vehicle wheel, the combination with a rim; of a tire formed of a coil spring and mounted upon said rim, clamping members for securing said tire in position and each having a head insertible between adjacent convolutions of said tire and provided with recesses for receiving said adjacent convolutions, one of said clamping members extending partly around the felly of the wheel and having an apertured plate upon the end opposite the head thereon, the other clamping member also having an apertured plate, and a bolt connecting said plates for securing said clamping members together.

3. In a vehicle wheel, the combination with a rim; of a tire formed of a coil spring and mounted upon said rim, clamping members for securing said tire in position and each having a head insertible between adjacent convolutions of said tire and provided with recesses receiving said adjacent convolutions, one of said clamping members extending partially around the felly of the wheel and having an apertured plate upon the end opposite the head thereon, the other clamping member also having an apertured plate, a bolt connecting said plates for securing said clamping members together, and a guard interposed between the first named clamping member and said felly.

In testimony whereof, I affix my signature in the presence of two witnesses.

HARRY WHITESELL.

Witnesses:
E. V. PERRY,
D. L. WHITESELL.

Copies of this patent may be obtained for five cents each, by addressing the "Commissioner of Patents, Washington, D. C."